US008358731B2

(12) United States Patent  (10) Patent No.: US 8,358,731 B2
Jestice  (45) Date of Patent: Jan. 22, 2013

(54) METHOD AND APPARATUS FOR DETECTING AND CLASSIFYING EXPLOSIVES AND CONTROLLED SUBSTANCES

(75) Inventor: Aaron L. Jestice, Reston, VA (US)

(73) Assignee: FAJ International Holdings, LLC, Herndon, VA (US)

( * ) Notice: Subject to any disclaimer, the term of this patent is extended or adjusted under 35 U.S.C. 154(b) by 645 days.

(21) Appl. No.: 12/368,156

(22) Filed: Feb. 9, 2009

(65) Prior Publication Data

US 2009/0147915 A1    Jun. 11, 2009

Related U.S. Application Data

(62) Division of application No. 10/753,355, filed on Jan. 9, 2004, now Pat. No. 7,505,544.

(60) Provisional application No. 60/438,993, filed on Jan. 10, 2003.

(51) Int. Cl.
    *G21B 1/00*    (2006.01)
(52) U.S. Cl. .... 376/159; 376/157; 376/257; 250/390.02
(58) Field of Classification Search .................. 376/159, 376/157, 257; 250/390.02, 392, 391, 390.04
    See application file for complete search history.

(56) References Cited

U.S. PATENT DOCUMENTS

| | | | |
|---|---|---|---|
| 3,832,545 A * | 8/1974 | Bartko | 376/159 |
| 4,864,142 A | 9/1989 | Gomberg | |
| 4,882,121 A | 11/1989 | Grenier | |
| 5,076,993 A * | 12/1991 | Sawa et al. | 376/159 |
| 5,080,856 A * | 1/1992 | Grenier et al. | 376/159 |
| 5,098,640 A * | 3/1992 | Gozani et al. | 376/166 |
| 5,114,662 A * | 5/1992 | Gozani et al. | 376/159 |

(Continued)

FOREIGN PATENT DOCUMENTS

EP    0336634    10/1989

OTHER PUBLICATIONS

Barry Sherlock, "Wavelet Based Feature Extraction for Target Recognition and Minefield Detection", May 21, 2002.

*Primary Examiner* — Richardo Palabrica
(74) *Attorney, Agent, or Firm* — Dickstein Shapiro LLP

(57) ABSTRACT

A system for detecting and classifying small amounts of explosives and other controlled substances while rejecting confounders, including a source/detector array formed of a plurality of sources and a plurality of detectors, a signal processor coupled to the source/detector array for processing data received from the detectors, a classifier coupled to the signal processor for classifying data received from the signal processor according to a plurality of algorithms, a maximal rejection classifier coupled to the classifier; and a declarative decision module coupled to the maximal rejection classifier for rendering an accurate decision regarding the contents of the object is provided. The apparatus includes an enclosure, a shield layer disposed within the enclosure, a cavity disposed within the shield layer, a plurality of neutron sources and a detection array disposed within the cavity, and a transport mechanism for moving objects through the cavity past the sources and detection array. The cavity has one or more turns which preclude a straight line trajectory through the cavity. The shield layer is water-filled to prevent stray radiation from exiting the enclosure. The use of multiple lower power neutron sources and the particular geometry of the enclosure provide a compact, relatively lightweight explosive detection system which is practical for use in airports and other public locations.

21 Claims, 6 Drawing Sheets

U.S. PATENT DOCUMENTS

| | | |
|---|---|---|
| 5,124,554 A * | 6/1992 | Fowler et al. ............. 250/358.1 |
| 5,142,153 A | 8/1992 | Gomberg |
| 5,144,140 A | 9/1992 | Allyson et al. |
| 5,557,108 A | 9/1996 | Tumer |
| 5,606,167 A | 2/1997 | Miller |
| 6,393,085 B1 | 5/2002 | Heller et al. |
| 6,563,898 B1 | 5/2003 | Vourvopoulos et al. |
| 6,791,089 B1 | 9/2004 | Caffrey et al. |

* cited by examiner

METHOD AND APPARATUS FOR DETECTING AND CLASSIFYING EXPLOSIVES AND CONTROLLED SUBSTANCES

This application is a divisional of U.S. application Ser. No. 10/753,355, filed Jan. 9, 2004 now U.S. Pat. No. 7,305,544, which claims the benefit of U.S. Provisional Application No. 60/438,993, filed Jan. 10, 2003, the disclosures of which are hereby incorporated by reference in their entirety.

BACKGROUND OF THE INVENTION

Heightened security concerns worldwide have greatly increased the need for rapid and accurate detection and classification of controlled substances. Detection of controlled substances, with greater certainty, is especially critical at points of entry into countries, transportation hubs, sensitive facilities (e.g., nuclear power plants), and buildings. Securing airports from controlled substances such as explosives, nuclear material, drugs, pathogens, food and their component parts has been complicated by the large volume of luggage moved through airports each day. Currently, luggage is subjected to visual screening using x-ray and/or similar detection devices. This system relies on thousands of individual inspectors to detect all controlled substances and contraband and their component substances despite the efforts of individuals to disguise and hide such materials. However, detection and classification of explosives and certain other controlled substances, and their components, are not amenable to visual inspection either directly or through the use of x-ray machines. Furthermore, previous systems for detecting and classifying explosives and controlled substances are large, very expensive to operate, difficult and expensive to maintain, compromised in terms of speed and detection sensitivity, and result in a high rate of false positive detections.

Various detection systems have been developed to address the need for mechanized detection of explosives and controlled substances. However, to be effective, such detection systems must employ powerful sources, which are quite large and emit potentially dangerous radiation. Attempts to shield workers and the general public from these radiation sources, while providing a reliable detection system of a sufficiently small size to have practical application, have not previously been successful. Accordingly, the radiation sources and the enclosures needed to shield operators and/or the general public from harmful radiation which have been developed to date are simply impractical for use in many facilities including airports and other sensitive locations.

U.S. Pat. No. 5,144,140 ("the '140 patent") is directed to an analyzer for detecting explosives having at least one source and several detectors having substantially the same spacing from the source. Col. 2, lines 3-5. According to the '140 patent, it is known that when nitrogen, a prime component of explosives, is irradiated with neutrons, it emits gamma rays at predetermined frequencies. Col. 1, lines 14-60. However, since clothing may contain nitrogen at levels that are not significantly different from explosives, analyzers may not be able to distinguish between clothing and explosives. Id. According to the '140 patent, optimizing the distance between the detector and source makes it possible to detect explosives in luggage to a "sufficiently high sensitivity." Col. 1, line 64-col. 2, line 2.

U.S. Pat. No. 5,076,993 ("the '993 patent") discloses the use of high energy neutrons in systems to detect contraband to avoid the use of a large number of gamma detectors and to permit sequential interrogating of small volume elements of the object. U.S. Pat. No. 5,098,640 discloses the use of fast neutrons (e.g. 14 MeV) to induce prompt gamma rays from a target object. U.S. Pat. No. 4,882,121 also discloses the use of a 14 MeV neutron generator to irradiate an object suspected of containing an explosive to generate fast gamma photons which are analyzed to determine the nitrogen/oxygen ratio in the object. The ratio is compared to the ratio associated with the explosive to determine if the object contains an explosive. U.S. Pat. No. 5,606,167 discloses the use of a single neutron source to develop a total neutron cross-spectra of an object to identify elements of explosives.

None of the prior systems for detecting explosives and controlled substances are designed to fit in an practically-sized enclosure, operate at a sufficiently low power level, and emit sufficiently low radiation levels to make the same suitable for use in public places, such as airports. Also, although the prior systems are capable of detecting particular explosives and substances, they do not reliably classify the data received to provide an indication of the type of substance detected.

SUMMARY OF THE INVENTION

The present invention overcomes the limitations of the prior art by providing a relatively low power level system for detecting and classifying explosives and other controlled substances in a relatively small enclosure which effectively contains harmful radiation (e.g., stray neutron and gamma radiation) from reaching the environment outside of the enclosure.

In a preferred embodiment, the system of the present invention for accurately detecting and classifying explosives and controlled substances includes a source/detector array including a plurality of sources and a plurality of detectors; a signal processor coupled to the source/detector array for processing data received from the detectors; a classifier coupled to the signal processor for classifying data received from the signal processor according to a plurality of algorithms; a maximal rejection classifier coupled to the classifier; and a declarative decision module coupled to the maximal rejection classifier for rendering a decision regarding the contents of the object.

The exemplary apparatus of the present invention for detecting explosives and controlled substances preferably includes an enclosure, a shield layer disposed within the enclosure, a cavity disposed within the shield layer, a source/detection array disposed within the cavity, and a transport mechanism for moving objects through the cavity past the sources and detection array. Preferably, the cavity comprises one or more turns which preclude a straight line trajectory through the cavity. The enclosure can be in the shape of a rectangle, circle, triangle, square, or any other suitable shape. In one preferred embodiment, the shield layer prevents stray radiation from exiting the enclosure. In another preferred embodiment, the shield layer includes a shield layer (e.g., water, polyethylene) contained between the enclosure and the cavity. The cavity preferably has at least three connected segments. The cavity is provided with a plurality of relatively low intensity neutron sources for generating neutrons and a plurality of gamma detectors for detecting prompt gamma rays emitted by the object after irradiation with the neutrons. The neutron sources can be arranged in an array in close proximity to the object. In one embodiment, the neutron sources are disposed on at least two sides of the array. Preferably, the neutron sources irradiate an object with neutrons as the object is moved through the cavity past the detector array by the transport mechanism.

The preferred method of the invention is to irradiate an object with neutrons, detect the gamma rays emitted by all substances contained within the object in response to the irradiation, determine the gamma counts, isolate the common eigen value signatures of the substances contained within the object, and use a maximal rejection hierarchy classifier to determine if a controlled substance is present in the object without interference by the presence of a confounding substance. In one preferred embodiment of the invention, the object is irradiated with relatively low intensity neutrons (e.g., each source of $10^7$ neutrons/sec) from a plurality of neutron sources. The neutron sources are preferably pulsed simultaneously in order to maximize either the number of neutrons or intensity applied to the object. The neutron sources can also be pulsed sequentially to provide a spatial scan of the object. Explosives and other controlled substances detected and correctly classified by preferred methods of the invention include TNT, PETN, RDX, HMX, Ammonium Nitrate, Plutonium, Uranium, Drugs, and many potential confounders such as Nylon and Foods. For example, detected substances in the energy range of interest contain at least carbon, oxygen, and nitrogen having gamma counts in the following energy intervals: 4.43 MeV, 6.14 MeV, and 2.31 MeV.

Other features and advantages of the present invention will become apparent when the following description is read in conjunction with the accompanying drawings.

DETAILED DESCRIPTION OF THE PREFERRED EMBODIMENT

Figure 1:
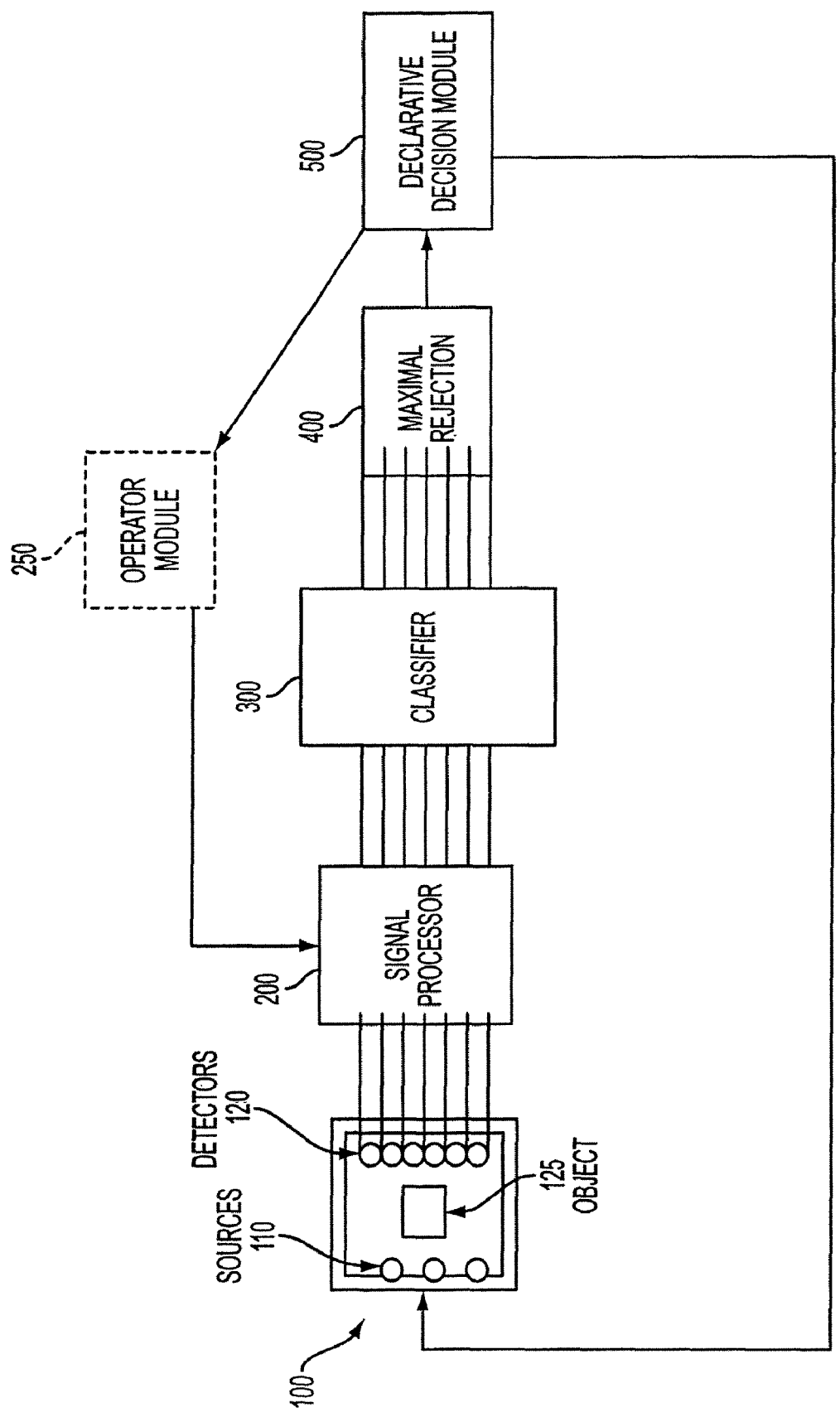
FIG. 1 depicts an exemplary system for detecting explosives and/or controlled substances in accordance with preferred embodiments of the invention.

Referring to FIG. 1, a preferred system of the present invention is shown, including a source/detector array 100 having a plurality of sources 110 and a plurality of detectors 120. In one preferred embodiment, sources 110 are small pulse neutron generators capable of emitting neutrons at 14.7 MeV with an energy of about $10^7$ neutrons/sec each. In another embodiment of the invention, the energy emitted by sources 110 can be varied depending on the desired level of sensitivity. Neutron generators can optionally emit low intensity neutrons in all directions from sources 110. Sources 110 emit neutrons which can penetrate an object 125 within source/detector array 100 (e.g., luggage).

When neutrons penetrate object 125, they interact with atomic nuclei within substances contained within and on the outside of object 125 in two distinct ways: collision or absorption. In a collision process, the neutrons collide with an atom's nucleus and bounce off in an elastic or inelastic collision. In an absorption process, neutrons may enter the nucleus and be absorbed. In the absorption process, the resultant nucleus has excess energy from absorption of the neutron. In order to lower its excess energy, the nucleus emits "prompt" gamma radiation in manner characteristic of the particular material from which the nucleus is derived. For example, if the resultant nucleus is radioactive, it will decay by emission of particles and/or gamma radiation characteristic of that particular nuclide. The amount of gamma radiation emitted by the nucleus relates to the amount of energy absorbed by the nucleus.

Detectors 120 can be any detector suitable for detecting gamma radiation (e.g., NaI(TI) or other suitable scintillation detector). Each detector determines the spectral density of prompt gamma radiation it receives producing a characteristic spectrum. In one embodiment, detectors 120 determine the spectral density of radiation received from the object in the energy range of about 0 to about 8 MeV.

In a preferred embodiment of the invention, the spectral densities derived from each of detectors 120 are transmitted to signal processor 200. Signal processor 200 can isolate common signatures (e.g., eigen signatures) and independent signatures for the composition of the chemical substance of interest (e.g., explosives and/or controlled substances). The term "common signature" refers to energy levels characteristic of a known substance that can be isolated, for example, from spectral density data transmitted by detectors 120. The term "independent signature" refers to energy levels characteristic of an unknown substance that can be isolated, for example, from spectral density data transmitted by detectors 120. Preferably, signal processor 200 isolates common and/or independent signatures from spectral density data transmitted by each of detectors 120. In another preferred embodiment, signal processor 200 isolates common and/or independent signatures from spectral density data transmitted by one or more of detectors 120.

In another preferred embodiment, the system provides an operator module 250 which can instruct signal processor 200 to search for and isolate signatures relevant to particular explosives or controlled substances and components thereof. For example, operator module 250 can be a computer terminal coupled to the signal processor for inputting parameters which define the explosives and/or controlled substances signal processor 200 will identify. Thus, if an operator wants to narrow the search parameters to search for anthrax and fissile material only, the operator can instruct the signal processor 200 accordingly using operator module 250.

Preferably, the signature data isolated by signal processor 200 is transmitted to classifier 300. Classifier 300 preferably processes and analyzes the signature data in order to reduce the chance of misclassification of an explosive or other controlled substance through detection of confounders and/or background noise. The term "confounders" refers to substances that are not related to or incorporated in an explosive or a controlled substance. For example, a confounder may include a substance or material normally present in luggage (e.g., clothing, toiletries, and food) or a substance or material placed into the luggage deliberately to conceal or mask the presence of an explosive and/or a controlled substance.

While prior explosive and controlled substance detection systems are capable of detecting the presence of components of explosives and/or controlled substances, such systems readily detect the presence of confounding material resulting in a high rate of false positive and/or false negative detection. The term "false positive" refers to incorrect detection of an explosive and/or controlled substance in an object while "false negative" refers to a failure to detect the presence of an explosive and/or controlled substance in an object. False positives result in greatly increased costs as objects may be needlessly manually searched, detained, or destroyed. False negatives may result in undetected explosives and/or controlled substances entering sensitive facilities resulting in increased danger to the public.

Classifier 300 greatly reduces the incidence of false positives and false negatives by applying several analytical tools in parallel to the signatures isolated by signal processor 200. In one preferred embodiment, classifier 300 subjects the signatures to a combination of Principle Component Analysis, Wavelet Analysis, and Independent Component Analysis. Analytical tools (e.g., Principle Component Analysis, Wavelet Analysis, and Independent Component Analysis) can ensure that the feature vectors extracted from the signatures received from signal processor 200 are: (1) relevant to the classification task; and (2) eliminate signatures related to background noise or irrelevant substances or components. Preferably, classifier 300 significantly reduces or completely eliminates background noise. The combination of the signal processor and classifier can yield significant signal enhancement gain further reducing neutron source generator power and requiring less shielding.

In a preferred embodiment, each signature received by classifier 300 from signal processor 200 is processed in parallel through one or more analytical tools (e.g., Principle Component Analysis, Wavelet Analysis, and Independent Component Analysis). The term "processed in parallel" refers to each signature being subjected to independent analysis by each analytical tool. Alternatively, each signature can be processed in series (i.e., by each analytical tool in turn). By using several analytical tools, classifier 300 greatly increases the probability that: (1) the system will not identify a confounder; and (2) the system will not miss a signature associated with the explosive and/or controlled substance material being sought.

Analytical tools for use in the systems of the invention are described in, for example, the following references: S. Theodoridis, K. Koutroumbas, "Pattern Recognition," Academic Press, 1999; S. Mallat, "A Wavelet Tour of Signal Processing," Academic Press, 1998; A. Hyvärinen, J. Karhunen, E. Oja, "Independent Component Analysis," John Wiley & Sons, 2001; S. Haykin, "Neural Network: A Comprehensive Foundation," Prentice-Hall, 1999; and B. Scholkopf, C. Burges, A. Smola, "Advances in Kernal Methods Support Vector Learning," MIT Press, 1999.

In another preferred embodiment, the several analytical tools used by classifier 300 result in one or more identifications of explosives and/or controlled substances. The resulting analysis from each analytical tool can be transmitted from classifier 300 to maximal rejection classifier 400 for determination of the identity of the components of the object. Preferably, maximal rejection classifier 400 subjects the analyses received from classifier 300 to a hierarchy of classifiers that incorporate neural network technology and other support vector machines. For example, maximal rejection classifier 400 can include an iterative algorithm for non-time sensitive target change detection for explosive material in a non-explosive object. Thus, the iterative algorithm can accurately distinguish small amounts of explosive material contained within non-explosive material while reliably rejecting confounders.

Figure 2:
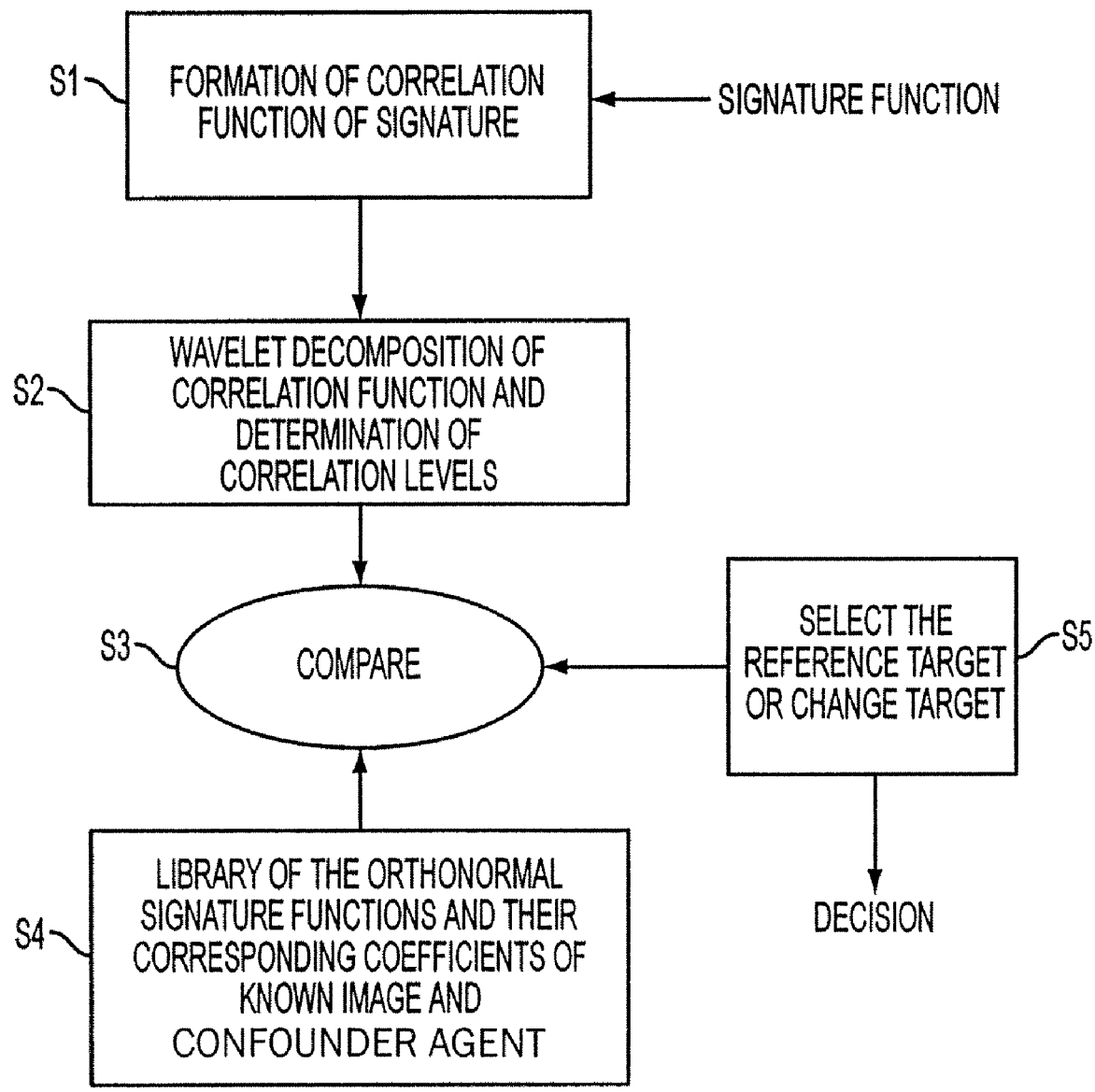
FIG. 2 depicts the steps in an exemplary algorithm in running mode for detecting explosives and/or controlled substances in an object in accordance with preferred embodiments of the invention.

In one preferred embodiment, the iterative algorithm can function in two distinct modes: running mode and learning mode. In running mode, wavelets procedures are used to identify high probability interest areas. FIG. 2 depicts an exemplary iterative algorithm in running mode. In reference to FIG. 2, signature is subjected to formation of a correlation function S1. Next, the algorithm performs wavelet decomposition of the correlation function and determines correlation levels S2. The signature signals constitute multiple peaks with various heights and features. These features are compared to a library of orthonormal signature functions S3 and their corresponding coefficients of known image and interference S4. Based on the comparison step S3, the signature can be matched to the signature for a known explosive or controlled substance S5. In another preferred embodiment, a deterministic correlation function is formed.

In yet another preferred embodiment, a wavelet decomposition transform of the autocorrelation function can be formed to detect noise from the signature data and accentuate the peak of the autocorrelation function at the given scale. In this embodiment, additional contrast between different explosive and/or controlled substances can be achieved thereby decreasing the probability of error.

Figure 3:
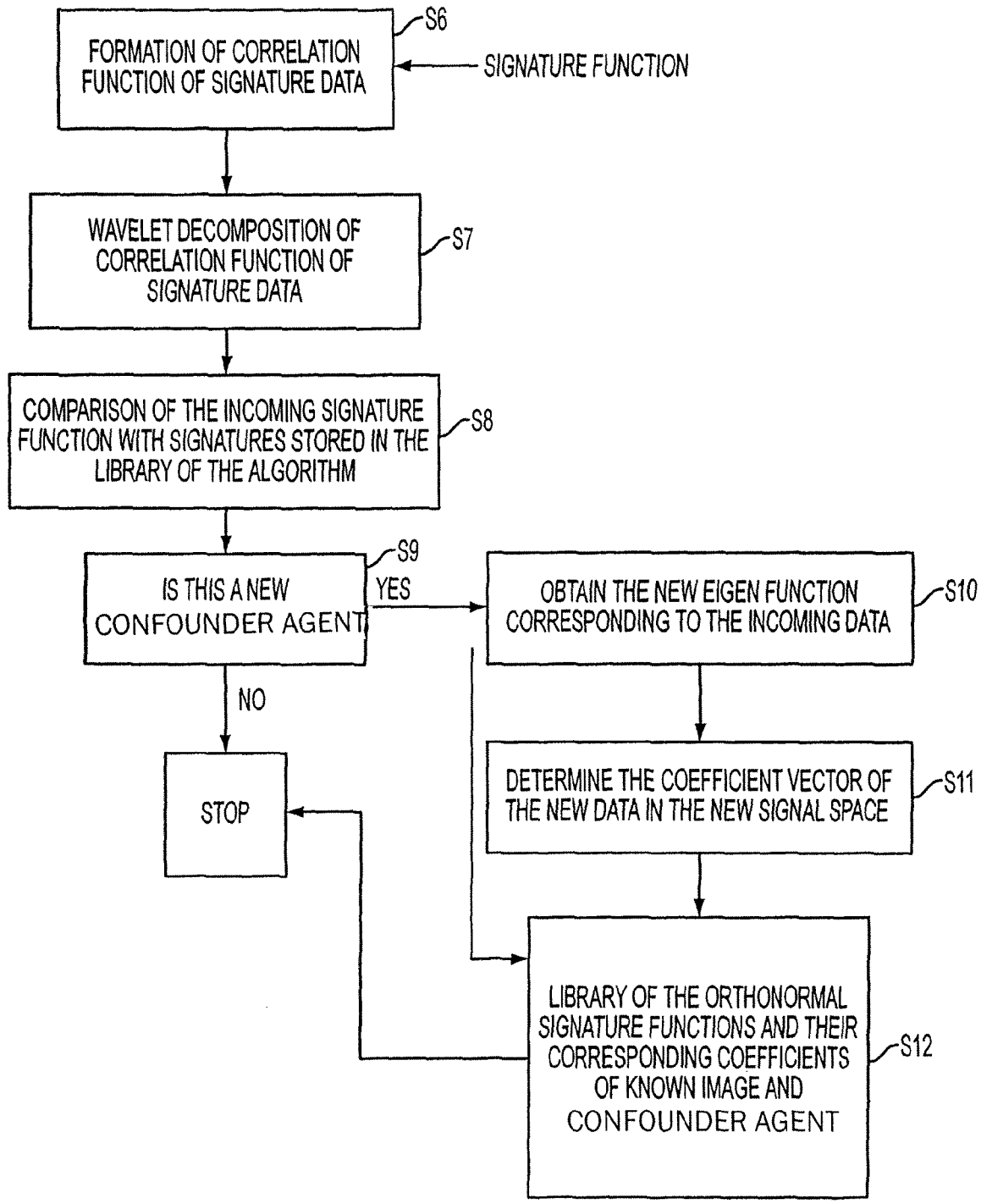
FIG. 3 depicts the steps in an exemplary algorithm in learning mode for detecting explosives and/or controlled substances in an object in accordance with preferred embodiments of the invention.

FIG. 3 depicts an exemplary iterative function in learning mode. First, a correlation function of signature data is formed S6 followed by wavelet decomposition of the correlation function S7. The incoming signature function is compared with the signatures stored in the library of signatures S8. If the signature cannot be identified S9 (i.e., it is a new interference agent) by comparison to the library of signatures, a new eigen function corresponding to the new signature is formed S10 and a coefficient vector of the new data in new signal space is determined S11. This new information regarding the new signature is stored in the library of orthonormal signatures S12. In learning mode, the algorithm can sense, process, and add an unknown interference agent to the library of the algorithm.

Utilizing these characteristic gamma radiations, and a knowledge of the unique chemical composition of explosives and other contraband materials, preferred systems of the invention can characterize materials contained within or on objects. The spectrum of gamma radiation detected by the gamma detectors in the cavity contain the characteristic energies resulting from the interactions of the neutrons and the nuclei of interest, e.g. nitrogen, oxygen and carbon. The data corresponding to the energy intervals of interest can be a function of the resolution and detector efficiency at the specific energy of interest. Using this information, each of detectors 120 can be calibrated to remove spectra background (e.g., radiation background) for each detector resulting in a greatly improved signal to noise ratio.

Preferably, maximal rejection classifier 400 identifies which analysis conducted by classifier 300 is correct. For example, classifier 300 can provide an analytical result from each of the analytical tools used for analysis of the signatures provided by signal processor 200. Maximal rejection classifier 400 selects the correct analysis provided by classifier 300. This information is provided to declarative decision module 500. In one preferred embodiment of the invention, the decision is transmitted to operator module 250. Alternatively, the decision can be transmitted to a computer or network of computers. In another preferred embodiments, an alarm can be triggered by the decision, for example, if an explosive or controlled substance is identified.

Figure 4:
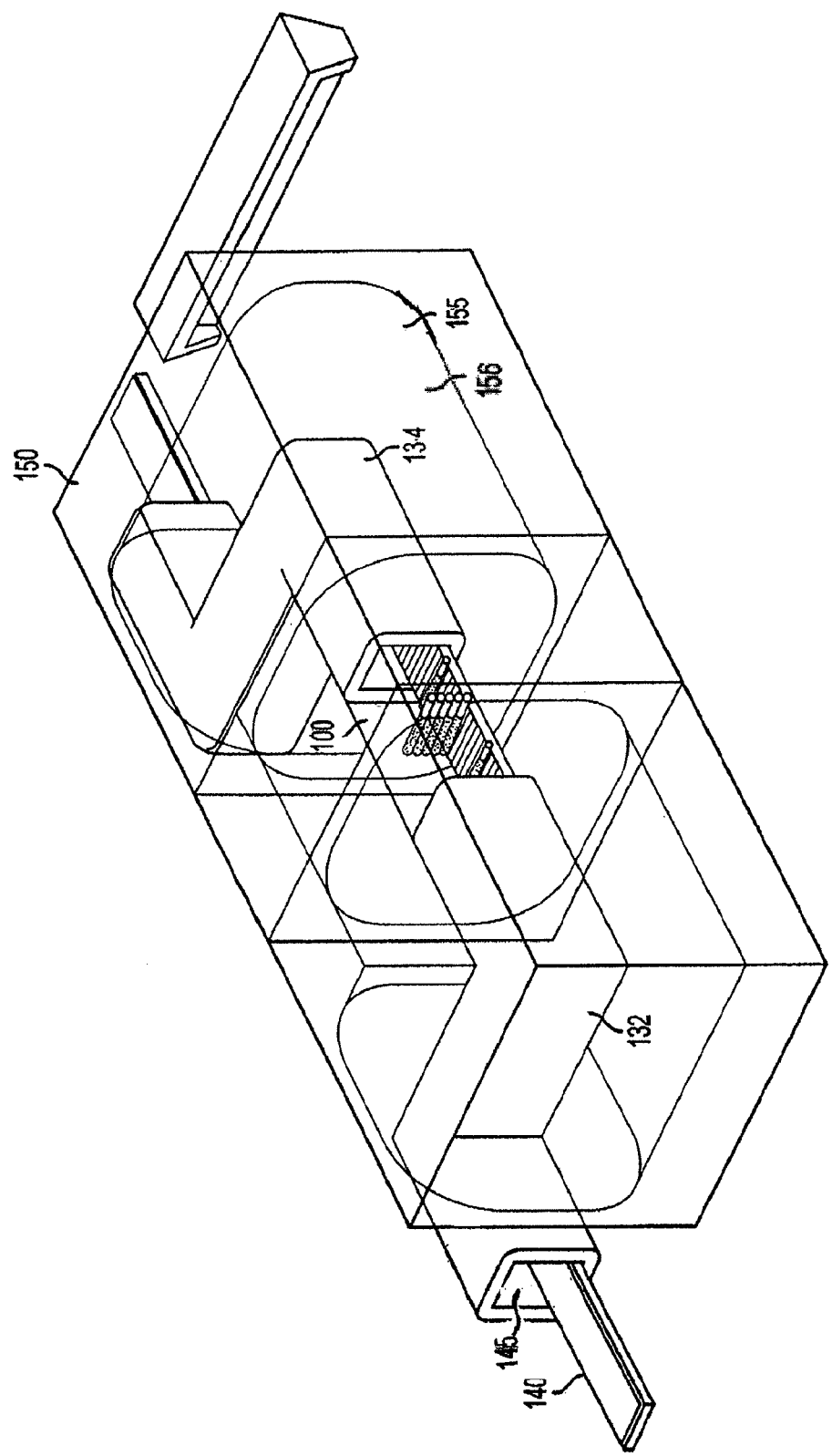
FIG. 4 depicts cut-away overhead/side view of the apparatus in accordance with a preferred embodiment of the invention.

Referring to FIG. 4, a preferred apparatus of the present invention comprises an enclosure 150, a shield layer 155 disposed within the enclosure, a cavity 145 disposed within the shield layer 155, a neutron source/gamma ray detection array 100 disposed within the cavity 145, and a transport mechanism 140 for moving objects through the cavity 145 and past the source/detection array 100.

Previous enclosures housing apparatus for detecting controlled substances have limited use because of the need to reduce or eliminate contamination of the public outside of the enclosure by the radiation (e.g., stray neutron and/or gamma radiation) generated during the detection process. These enclosures must be sufficiently large and contain sufficient shielding to prevent the escape of stray radiation. The need for large enclosures holding high energy density sources needed to detect small size substances significantly limits practical application of previous apparatus. The preferred enclosure of the invention can be significantly smaller due to the configuration of cavity and the neutron generator/gamma ray detectors in a manner which prevents escape of stray radiation.

In a preferred embodiment, the cavity comprises one or more turns (e.g., turns 132 and 134) which preclude a straight line trajectory through the cavity. Since stray radiation cannot travel past these turns, the stray radiation cannot escape the apparatus via the cavity. The turns can be of any shape or configuration suitable for preventing the stray radiation from traveling in a straight line trajectory through the cavity. In one embodiment, the cavity comprises at least three connected segments. The segments are connected in any suitable order or at any suitable angle. Preferably, at least two of the segments are connected to at least another segments at an angle less than or equal to 90 degrees. Alternatively, at least two of the segments are connected to at least another segments at an angle more than 90 degrees. By reducing or eliminating travel of stray radiation through the cavity, the enclosure used in the preferred apparatus can be significantly smaller than the enclosures of previous apparatus.

Enclosures for use in the invention can be of any suitable shape (e.g., rectangle, circle, triangle, square etc.). In one embodiment, the enclosure is rectangular. The rectangular enclosure is relatively compact, and, in one preferred embodiment, has dimensions of no more than 6 meters in length, 3 meters in width, and 3 meters in height, which is practical for installation in airports and other transportation facilities.

Referring to FIG. 4, a shield layer 155 is provided between the cavity and the enclosure. The shield layer prevents stray radiation from exiting the cavity 145 and the enclosure 150. The preferred material in shield layer 155 preferably includes water 156, which is especially useful in blocking neutron rays. However, any suitable material for blocking neutron rays can be used in the shield layer.

Figure 5:
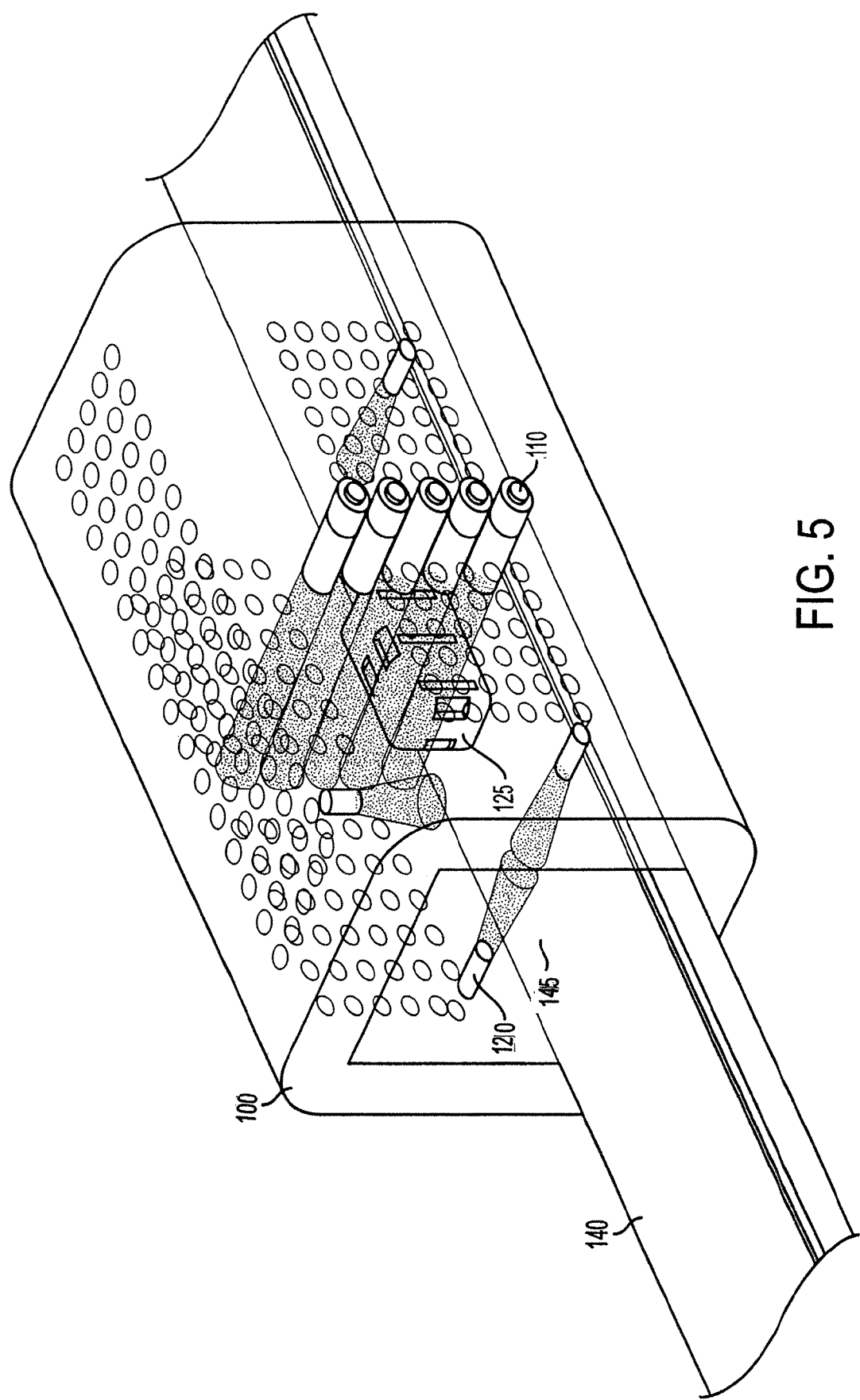
FIG. 5 depicts a cut-away side view of the display array in accordance with a preferred embodiment of the invention.

The apparatus of the invention preferably includes a source/detection array 100 for detecting the presence of explosives and controlled substances inside an object. Referring to FIG. 5, source/detection array 100 is disposed within cavity 145 and permits transport mechanism 140 to move object 125 through source/detection array 100. Source/detection array 100 can be of any suitable shape. Preferably, source/detection array 100 has four sides (top, bottom, right, and left) such that object 125 is surrounded on four sides when it enters source/detection array 100. Alternatively, source/detection array 100 can have one or more sides.

Source/detection array 100 comprises a plurality of neutron sources 110 which can be arranged in close proximity to object 125 as it passes through source/detection array 100. Neutron sources 110 can be arranged so that an equal number of neutron sources 110 are disposed on at least two sides of detection array 100. In one preferred embodiment of the invention, neutron sources 110 are small pulse neutron generators capable of emitting neutrons at 14.7 MeV (each with an energy of $10^7$ neutrons/sec). and the array 100 is provided with 10 neutron sources, five on each of two opposing sides. Alternatively, neutron sources 110 can be located at several locations along the cavity. Significantly, by using a plurality (e.g., ten in this embodiment) of less powerful ($10^7$) neutrons/sec sources, rather than one more powerful ($10^{11}$) neutrons/sec source, the size of the present invention can be significantly reduced to a practical level, while maintaining required sensitivity to detect small size substances.

Source/detection array 100 further comprises a plurality of gamma detectors 120 which can be arranged in close proximity to object 125 as it passes through detection array 100. In one embodiment, the gamma detector is a NaI(TI) or other suitable scintillation detector. Gamma detectors 120 can be arranged so that an equal number of gamma detectors 120 are disposed on at least two sides of detection array 100, around the respective neutron sources 110, or the detectors 120 can be provided on all four sides of the cavity. Preferably, gamma detectors 120 are sensitive to gamma photons emitted by carbon, nitrogen, oxygen, chlorine or any other chemical composition. In a preferred embodiment, detection array 100 comprises a mix of at least 100 gamma detectors 120.

Figure 6:
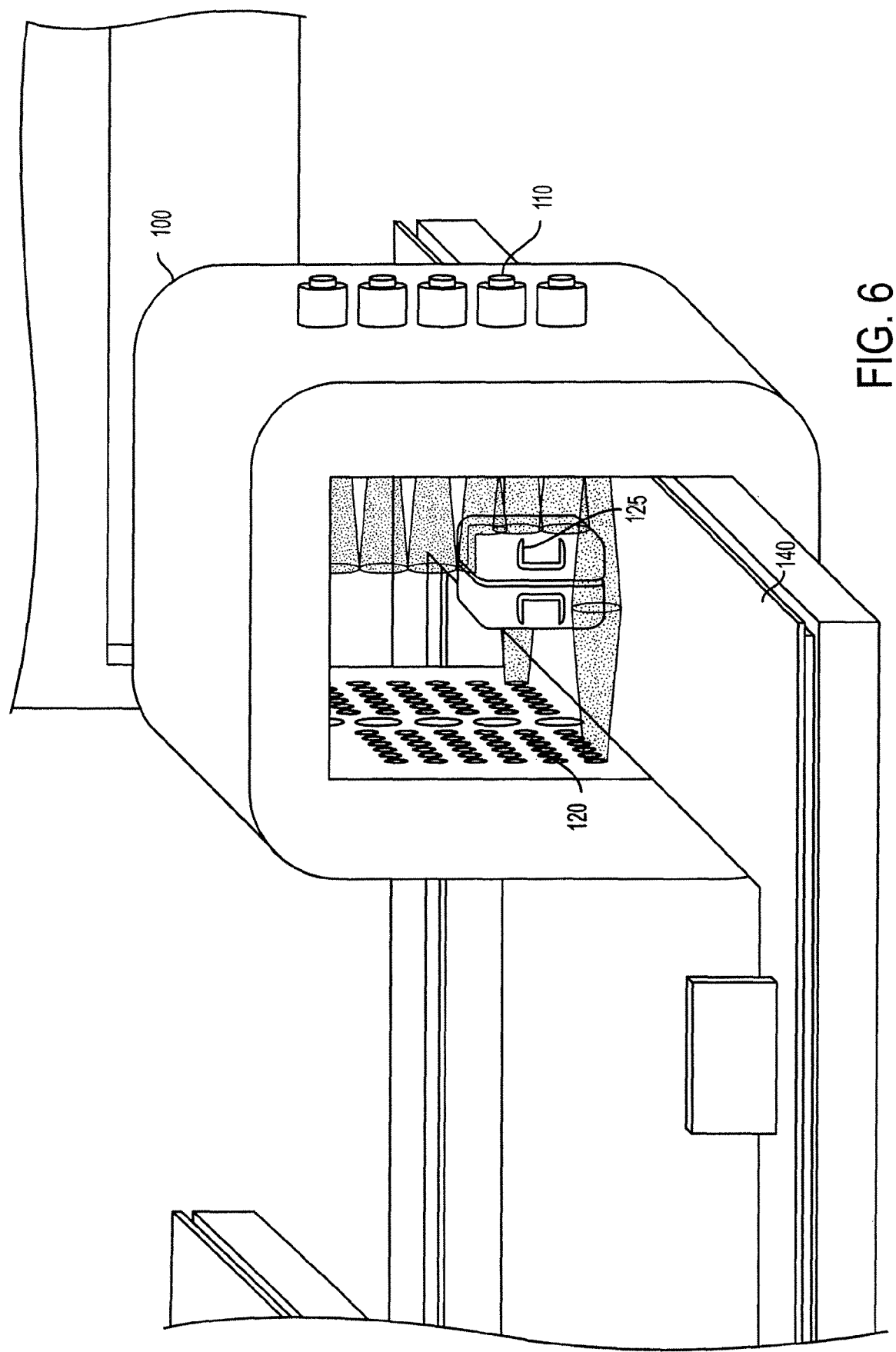
FIG. 6 depicts an object in the cavity being transported through the display array in accordance with a preferred embodiment of the invention

FIG. 5 shows a side cut-away view of source/detection array 100 and depicts object 125 on transport mechanism 140 inside source/detection array 100 and aligned with neutron sources 110 and gamma detectors 120. For clarity, a number of the gamma detectors 120 are represented by ovals. FIG. 6 shows a front view of object 125 on transport mechanism 140 inside source/detection array 100 and moving towards turn 132.

Referring to FIG. 4, in a preferred method of the present invention, an object is transported on transport mechanism 140 into cavity 145 in enclosure 150. Cavity 145 comprises one or more turns (e.g., turns 132 and 134) which preclude a straight line trajectory through cavity 145. As stated previously, precluding a straight line trajectory through cavity 145 prevents stray radiation from escaping from the open ends of cavity 145. Therefore, the size of the enclosure or facility needed to shield the user and/or the general public from gamma radiation is significantly reduced.

The object is transported inside of detector array 100 which is disposed around transport mechanism 140 inside of cavity 110. FIG. 5 depicts object 125 inside of detector array 100. Neutron sources 110 generate low intensity neutron particles and irradiate object 125. The neutron particles interact with nuclei in target substances in the object and generate prompt gamma ray photons resulting from inelastic scattering of neutrons from the target substances.

The gamma ray photons are detected by gamma detectors 120. A gamma count ratio for substances in object 125 may be determined and compared to known gamma count ratios for elements (e.g., carbon, nitrogen, oxygen, and chlorine) in explosives or other controlled substances. For example, the ratio of nitrogen to oxygen in the object following irradiation with neutrons may be characteristic of the ratio of nitrogen to oxygen in an explosive which is bombarded with neutrons. Thus, components of explosives have characteristic or signature ratio of various elements (e.g., nitrogen/oxygen, carbon/nitrogen, carbon/oxygen, nitrogen/carbon). If the gamma ray ratio emitted by an object is the same or similar to the signature gamma ray ratio for an explosive or other controlled substance, the object is likely to contain the same substance.

Alternatively, selected peaks of the energy spectrum of the detected prompt gamma rays are analyzed to provide a fingerprint or signature characteristic of the material in the object responsible for scattering the neutrons. The energy spectrum of the detected gamma rays can be compared to known energy spectra for elements (e.g., carbon, nitrogen, oxygen, and chlorine) in explosives and other controlled substances. The energy spectrum emitted from nuclei bombarded with neutrons produces characteristic gamma radiation patterns. Particular spectral lines are associated with, for example, carbon, nitrogen, oxygen, and chlorine. See, e.g., U.S. Pat. No. 5,098,640, hereby incorporated by reference in its entirety.

The use of a plurality of low intensity neutron sources, rather than one high intensity neutron source, not only reduces size of the shield, but also advantageously produces a lower amount of stray radiation, further improving the safety characteristics of preferred embodiments of the invention. In one embodiment, the neutron sources are pulsed simultaneously. The pulsing of a plurality (e.g., ten or more) of neutron sources at a lower energy density ($10^7$ vs $10^{11}$) will provide neutrons for detection purposes (e.g., sufficient ringing resonance to detect controlled substances) while reducing the overall risks associated with using a radioactive source.

Pulsing the plurality of neutron sources simultaneously provides sufficient power to detect the presence of an explosive or other controlled substance. Once a particular explosive or other controlled substance is detected, the plurality neutron sources can then be flashed, i.e., sequentially activated, to provide a lower power scan which however generates spatial information so the operator can more accurately identify the location of the explosive or controlled substance in the object of interest.

While the invention has been described in detail in connection with the exemplary embodiment, it should be understood that the invention is not limited to the above disclosed embodiment. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. An apparatus for detecting explosives and controlled substances in an object, comprising:
    an enclosure;
    a shield layer disposed within the enclosure;
    a cavity disposed within the shield layer, said cavity comprising one or more turns which preclude a straight line trajectory through the cavity;
    a source/detection array disposed within the cavity, the source/detection array comprising a plurality of neutron sources and a plurality of gamma detectors;
    a transport mechanism for moving objects through the cavity and past the source/detection array; and
    a means for:
        activating the plurality of neutron sources to irradiate an object with neutron particles to cause the object to generate gamma rays,
        analyzing gamma counts associated with the gamma rays detected by the plurality of gamma detectors to determine whether an explosive or controlled substance is present in the object, and
        activating the plurality of neutron sources to pulse sequentially if it is determined that an explosive or controlled substance is present in the object.

2. The apparatus of claim 1,
    wherein the means comprises a signal processor coupled to the source/detector array for processing data received from the detectors, and
    wherein the apparatus further comprises:
    a classifier coupled to the signal processor for classifying data received from the signal processor according to a plurality of algorithms;
    a maximal rejection classifier coupled to the classifier; and
    a declarative decision module coupled to the maximal rejection classifier for rendering a decision regarding the contents of the object.

3. The apparatus of claim 2, further comprising an operator module coupled to the signal processor.

4. The apparatus of claim 3, wherein the operator module is coupled to the declarative decision module.

5. The apparatus of claim 1, wherein the shape of the enclosure is rectangular.

6. The apparatus of claim 5, wherein the dimensions of the enclosure are no more than about 6 meters in length, about 3 meters in width, and about 3 meters in height.

7. The apparatus of claim 1, wherein the shape of the enclosure is selected from the group consisting of rectangular, circular, triangular, and square.

8. The apparatus of claim 1, wherein the shield layer substantially prevents gamma radiation and neutrons from leaving the enclosure.

9. The apparatus of claim 1, wherein the shield layer comprises water, wherein the water is contained between the enclosure and the cavity.

10. The apparatus of claim 1, wherein the cavity has an opening at each end.

11. The apparatus of claim 1, wherein the ends of the cavity are disposed on opposite sides of the enclosure.

12. The apparatus of claim 1, wherein the cavity further comprises at least three connected segments.

13. The apparatus of claim 12, wherein at least two segments of the cavity are connected to at least another segment at an angle of less than or equal to 90 degrees.

14. The apparatus of claim 12, wherein at least two segments of the cavity are connected to at least another segment at an angle of greater than 90 degrees.

15. The apparatus of claim 1 wherein the shape of the cavity is selected from group consisting of rectangular, circular, triangular, and square.

16. The apparatus of claim 1, wherein the detection array is disposed around the transport mechanism.

17. The apparatus of claim 16, wherein the array is arranged such that an equal number of neutron sources are disposed on at least two sides of the array.

18. The apparatus of claim 16, wherein the array is arranged such that an equal number of gamma detectors are disposed on at least two sides of the array.

19. The apparatus of claim 16, wherein each of the plurality of neutron sources is capable of emitting neutrons at 14.7 MeV or less with an energy of about $10^7$ neutrons/sec or less.

20. The apparatus of claim 16, wherein the plurality of neutron sources comprises at least 10 neutron sources.

21. The apparatus of claim 16, wherein the plurality of gamma detectors comprises at least 100 gamma detectors.

* * * * *